United States Patent
Lerner et al.

(10) Patent No.: US 11,498,387 B2
(45) Date of Patent: Nov. 15, 2022

(54) CROWDSOURCED REMOTE START FOR VEHICLE

(71) Applicant: Ford Global Technologies, LLC, Dearborn, MI (US)

(72) Inventors: Jeremy Lerner, Southfield, MI (US); Taylor Hawley, Dearborn, MI (US); Jae Hyung Lim, Canton, MI (US); Jason Joseph Woo, Northville, MI (US); Xiangrui Zeng, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 258 days.

(21) Appl. No.: 16/586,022

(22) Filed: Sep. 27, 2019

(65) Prior Publication Data
US 2021/0094385 A1    Apr. 1, 2021

(51) Int. Cl.
| | |
|---|---|
| *G08G 1/123* | (2006.01) |
| *H04W 4/021* | (2018.01) |
| *B60W 50/00* | (2006.01) |
| *B60H 1/00* | (2006.01) |
| *G08G 1/0968* | (2006.01) |
| *B60W 40/08* | (2012.01) |
| *G07C 5/00* | (2006.01) |
| *H04W 4/40* | (2018.01) |
| *G08G 1/00* | (2006.01) |

(52) U.S. Cl.
CPC ..... *B60H 1/00657* (2013.01); *B60H 1/00771* (2013.01); *B60W 40/08* (2013.01); *G07C 5/008* (2013.01); *G08G 1/096838* (2013.01); *G08G 1/202* (2013.01); *H04W 4/021* (2013.01); *H04W 4/40* (2018.02)

(58) Field of Classification Search
CPC ........... B60H 1/00657; B60H 1/00771; H04W 4/021; H04W 4/40; G08G 1/202; G08G 1/096838; G07C 5/008; B60W 40/08
See application file for complete search history.

(56) References Cited

U.S. PATENT DOCUMENTS

| | | | |
|---|---|---|---|
| 7,542,827 B2 | 6/2009 | Gerard et al. | |
| 10,093,253 B2 | 10/2018 | Gage et al. | |
| 2014/0371951 A1* | 12/2014 | Michael | F02N 11/0807 701/2 |
| 2017/0023377 A1* | 1/2017 | Burtner | G08B 13/2462 |

(Continued)

FOREIGN PATENT DOCUMENTS

WO       2019099033 A1    5/2019

*Primary Examiner* — Mathew Franklin Gordon
(74) *Attorney, Agent, or Firm* — Michael Spenner; Brooks Kushman P.C.

(57) ABSTRACT

A server includes a processor, programmed to receive a vehicle location from a vehicle, receive a weather condition of the vehicle location from a cloud server, responsive to receiving a calendar of a user including an event, calculate a departure time based on the vehicle location and a location of the event, responsive to receiving a desired cabin temperature of the user from a mobile device, calculate a minimum time for the vehicle to reach the desired cabin temperature based on the weather condition, calculate a vehicle start time using the departure time and the minimum time, and send an instruction to the vehicle to start at the vehicle start time.

19 Claims, 3 Drawing Sheets

(56) References Cited

U.S. PATENT DOCUMENTS

2019/0176752 A1    6/2019  Cermak et al.
2019/0287080 A1*   9/2019  Penilla .................. G07C 5/0808
2019/0320285 A1*  10/2019  Liang ................... H04W 4/029

* cited by examiner

CROWDSOURCED REMOTE START FOR VEHICLE

TECHNICAL FIELD

The present disclosure generally relates to a vehicle remote start system. More specifically, the present disclosure relates to a system controller vehicle remote start based on temperature.

BACKGROUND

Many vehicles are provided with remote start features to allow a user to start vehicle engine remotely before starting to use the vehicle. This feature may be particularly useful when the user desired temperature in the vehicle cabin is significantly different from the ambient temperature (e.g. in a cold winter or hot summer day). The user may use a remote control to transmit a radio-frequency (RF) signal to the vehicle to command the vehicle to start while within a short range from the vehicle. Additionally or alternatively, a remote control command may be transmitted to the vehicle via a wireless network (e.g. cellular network) from a mobile device operated by the user.

SUMMARY

In one or more illustrative embodiments of the present disclosure, a server includes a processor, programmed to receive a vehicle location from a vehicle, receive a weather condition of the vehicle location from a cloud server, responsive to receiving a calendar of a user including an event, calculate a departure time based on the vehicle location and a location of the event, responsive to receiving a desired cabin temperature of the user from a mobile device, calculate a minimum time for the vehicle to reach the desired cabin temperature based on the weather condition, calculate a vehicle start time using the departure time and the minimum time, and send an instruction to the vehicle to start at the vehicle start time.

In one or more illustrative embodiments of the present disclosure, a method for a server includes receiving a user profile from a mobile device associated with a user identifying a vehicle for a ride and a desired cabin temperature; receiving a vehicle location, a vehicle perceived condition, a vehicle configuration, and a vehicle historic temperature from the vehicle as identified; obtaining a calendar associated with the user including an event having an event location; calculating a departure time based on the vehicle location and the event location; receiving a weather condition of the vehicle location from a cloud server; calculating a minimum time for the vehicle to reach the desired cabin temperature based on the weather condition, the vehicle perceived condition, the vehicle configuration, and the vehicle historic temperature; calculating a vehicle start time using the departure time and the minimum time; and sending an instruction to the vehicle to start at the vehicle start time.

In one or more illustrative embodiments of the present disclosure, a non-transitory computer-readable medium includes instructions that, when executed by a processor of a computer, cause the computer to receive a user profile from a mobile device associated with a user identifying a vehicle for a ride and a desired cabin temperature; receive a vehicle location, a vehicle perceived condition, a vehicle configuration, and a vehicle historic, temperature from the vehicle as identified; obtain a calendar associated with the user including an event having an event location; calculate a departure time based on the vehicle location and the event location; receive a weather condition of the vehicle location from a cloud; calculate a geofence enclosing the vehicle location; responsive to identifying a plurality of fleet vehicles within the geofence, receive a fleet vehicle perceived condition, a fleet vehicle configuration, and a fleet vehicle historic temperature from the fleet vehicles; calculate a minimum time for the vehicle to reach the desired cabin temperature based on the weather condition, the vehicle perceived condition, the vehicle configuration, the vehicle historic temperature as received from the vehicle, the fleet vehicle perceived temperature, the fleet vehicle configuration, and the fleet vehicle historic temperature as received from the fleet vehicles; calculate a vehicle start time using the departure time and the minimum time; and send an instruction to the vehicle to start at the vehicle start time.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

Figure 1:
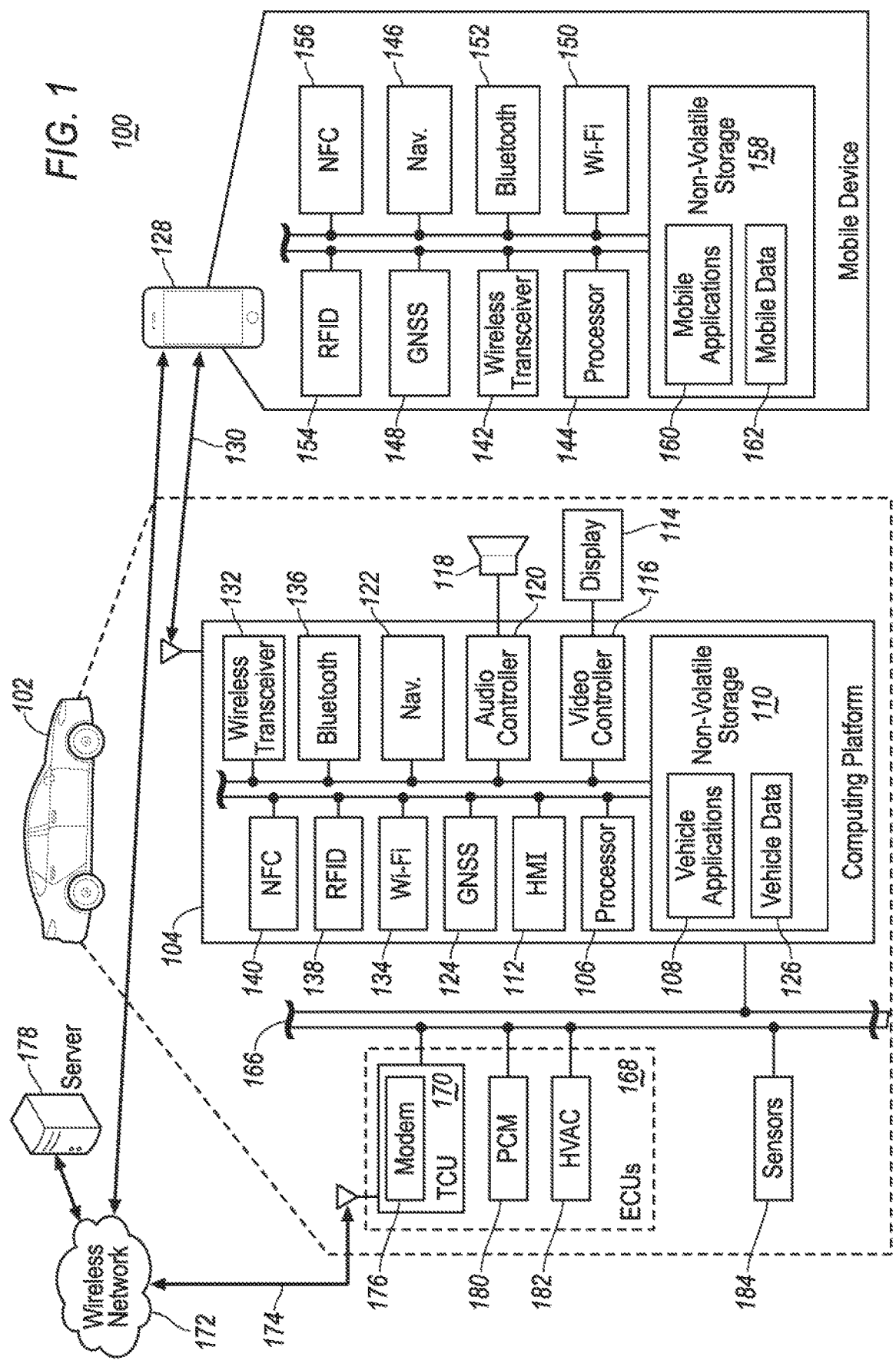
FIG. 1 illustrates an example block topology of a vehicle system of one embodiment of the present disclosure.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a vehicle remote start system configured to start the vehicle at a correct time calculated that the vehicle reaches a desired cabin temperature when the user starts to use the vehicle while minimizing idling and fuel consumption.

Conventionally, a vehicle user may manually control the remote start feature of a vehicle. For instance, the user may manually activate the vehicle remote start at an arbitrary time (e.g. 10 minutes) before a scheduled ride estimated that the vehicle will reach a desired cabin temperature via HVAC when the user starts the ride. However, this user estimated time may be inaccurate. If the vehicle starts too early, fuel may be wasted and vehicle component life may be reduced as some engines are not made to idle for long periods and HVAC component lifespan may be reduced. On the contrary, if the vehicle starts too late, it may not yet reached the desired cabin temperature when the user starts the ride, causing inconvenience and bad user experience. Additionally, due to factors such as weather condition, vehicle model, it may be difficult for the user to accurately estimate the correct time to start the vehicle.

The present disclosure proposes a system to more accurately calculate a time to start to vehicle. With various information including weather condition, vehicle model/configuration, vehicle year, fuel level or the like, the system may estimate the amount of time it will take for a vehicle to achieve a user-specified cabin temperature. The vehicle user may input into a mobile application his/her scheduled departure time. The scheduled departure time may be used only once, or alternatively set as a recurring event on certain days of the week. The mobile application may be configured to be associated with a calendar of the user to automatically obtain a scheduled departure time of a ride. With the estimated amount of idling time and the departure time, the system may determine the correct time to start the vehicle to achieve the desired temperature while minimizing fuel consumption.

Furthermore, to increase the accuracy of time calculation, the system may further utilize crowdsourced information from connection fleet vehicles and histories of cabin temperature for idling vehicles. For instance, a machine learning model may be created for all fleet vehicles within a geofence (e.g. a zip code). The model may take into account various information such as current outside weather condition (e.g. temperature, wind chill), vehicle perceived weather information (e.g. sun, shade, level, vehicle heading), and/or vehicle characteristics (e.g. model, configurations of HVAC components, engine characteristics). Additionally, the system may be configured to override commands if the vehicle is currently in an enclosed space such as a garage detected using vehicle sensors.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a battery electric vehicle (BEV), a hybrid electric vehicle (HEV) powered by both an internal combustion engine and one or move electric motors, such as a series hybrid electric vehicle (SHEV), a plug-in hybrid electric vehicle (PHEV), or a parallel/series hybrid vehicle (PSHEV), boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 106 configured to perform instructions, commands, and other routines in support of the processes described herein. For instance, the computing platform 104 may be configured to execute instructions of vehicle applications 108 to provide features such as navigation, remote controls, and wireless communications. Such instructions and other data may be maintained in a non-volatile manner using a variety of types of computer-readable storage medium 110. The computer-readable medium 110 (also referred to as a processor-readable medium or storage) includes any non, transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 112 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with one or more speakers 118 configured to provide audio output and input to vehicle occupants by way of an audio controller 120.

The computing platform 104 may also be provided with navigation and route planning features through a navigation controller 122 configured to calculate navigation routes responsive to user input via e.g., the HMI controls 112, and output planned routes and instructions via the speaker 118 and the display 114. Location data that is needed for navigation may be collected from a global navigation satellite system (GNSS) controller 124 configured to communicate with multiple satellites and calculate the location of the vehicle 102. The GNSS controller 124 may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data 126. Navigation software may be stored in the storage 110 as one the vehicle applications 108.

The computing platform 104 may be configured to wirelessly communicate with a mobile device 128 of the vehicle users/occupants via a wireless connection 130. The mobile device 128 may be any of various types of portable computing devices, such as cellular phones, tablet computers, wearable devices, smart watches, smartfobs, laptop computers, portable music players, or other device capable of communication with the computing platform 104. A wireless transceiver 132 may be in communication with a Wi-Fi controller 134, a Bluetooth controller 136, a radio-frequency identification (RFID) controller 138, a near-field communication (NFC) controller 140, and other controllers such as a Zigbee transceiver, an IrDA transceiver, a ultra-wide band (UWB) controller (not shown), and configured to communicate with a compatible wireless transceiver 142 of the mobile device 128.

The mobile device 128 may be provided with a processor 144 configured to perform instructions, commands, and other routines in support of the processes such as navigation, telephone, wireless communication, and multi-media processing. For instance, the mobile device 128 may be provided with location and navigation functions via a navigation controller 146 and a GNSS controller 148. The mobile device 128 may be provided with a wireless transceiver 142 in communication with a Wi-Fi controller 150, a Bluetooth controller 152, a RFID controller 154, an NFC controller 156, and other controllers (not shown), configured to communicate with the wireless transceiver 132 of the computing platform 104. The mobile device 128 may be further provided with a non-volatile storage 158 to store various mobile application 160 and mobile data 162.

The computing platform 104 may be further configured to communicate with various components of the vehicle 102 via one or more in-vehicle network 166. The in-vehicle network 166 may include, but is not limited to, one or more of a controller area network (CAN), an Ethernet network, and a media-oriented system transport (MOST), as some examples. Furthermore, the in-vehicle network 166, or portions of the in-vehicle network 166, may be a wireless network accomplished via Bluetooth low-energy (BLE), Wi-Fi, UWB, or the like.

The computing platform 104 may be configured to communicate with various ECUs 168 of the vehicle 102 configured to perform various options. For instance, the computing platform may be configured to communicate with a TCU 170 configured to control telecommunication between vehicle 102 and a wireless network 172 through a wireless connection 174 using a modem 176. The wireless connection 174 may be in the form of various communication network e.g. a cellular network. Through the wireless network 172, the vehicle may access one or more servers 178 to access various content for various purposes. It is noted that the terms wireless network and server are used as general terms in the present disclosure and may include any computing network involving carriers, router, computers, controllers or the like configured to store data and perform data processing functions and facilitate communication between various entities. The ECUs 168 may further include a powertrain control module (PCM) 180 configured to provide operate powertrain of the vehicle 102. For instance, the PCM 180 may be configured to start the vehicle responsive to receiving a command from the mobile device 128 via the TCU 170. The ECUs 168 may further include a HVAC controller 182 configured to control a climate system of the vehicle 102. For instance, the HVAC controller 182 may be configured to operate air-conditioning (AC), heating, seat ventilation heating or the like to provide the user with a customized cabin condition. The computing platform 104 may be further configured to communicate with various vehicle sensors 184 via the in-vehicle network 166 configured to measure various data of the vehicle 102. For instance, the sensors 184 may include a temperature sensor, a camera, a radar, a lidar, or the like.

Figure 2:
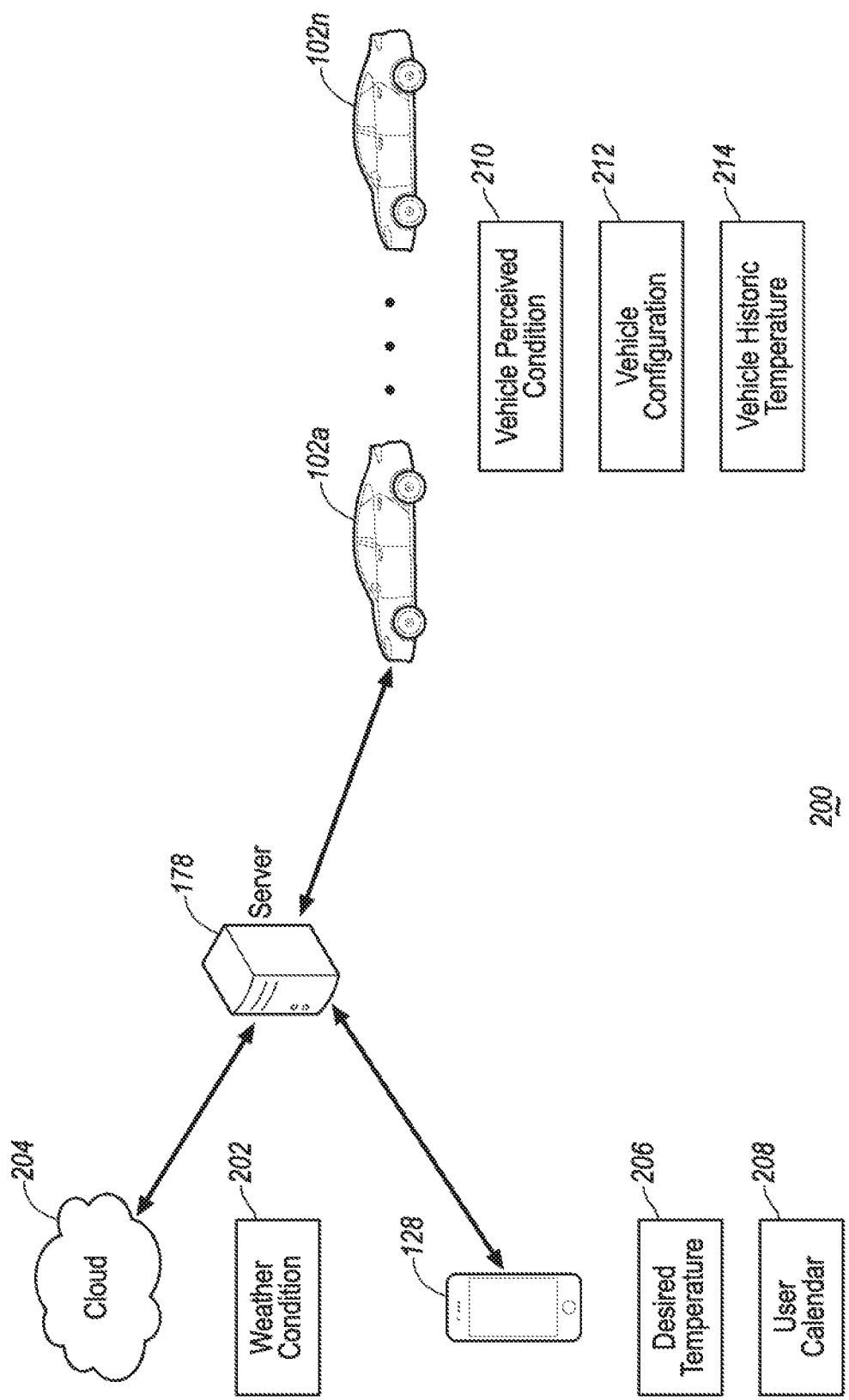
FIG. 2 illustrates an example schematic diagram of a vehicle system of one embodiment of the present disclosure.

Referring to FIG. 2, an example schematic diagram 200 of the vehicle system of one embodiment of the present disclosure is illustrated. With continuing reference to FIG. 1, in the present example, the server 178 may be configured to calculate a vehicle start time for the vehicle 102*a* using information from various sources. The server 178 may be configured to obtain a weather condition 202 for the location of the vehicle 102*a* from a cloud 204 which may include various local or remote servers associated with various entities. The server 178 may be configured to receive a user desired temperature 206 from the mobile device 128 associated with the user. The user may manually set the desired temperature 206 for each ride via the mobile device 128. Additionally or alternatively, the desired temperature 206 may be associated with a user profile and adjusted for different ride depending on various factors such as weather, outside temperature, season or the like. The user may further schedule a ride by manually inputting a departure time via the via the mobile device 128. Additionally or alternatively, the server 178 may be configured to access a user calendar 208 associated with the user to determine a time for each ride. The user calendar 208 may be stored in the mobile device 128 and/or further synchronized to the cloud 204 for the server 178 to access. Additionally, an estimated fuel level at the desired drive start time for the vehicle 102 may be visually provided for the user to consider setting the desired temperature. For instance, in a winter situation, setting a higher desired cabin temperature may make the vehicle idle longer and consumer more fuel. If a user opts to have the vehicle 102 set to sixty five (65) degree F., an estimated fuel level of 60% remaining may be provided to the user. Whereas if the user opts for sixty (60) degree F., the estimated fuel remaining may be 62%, saving 2% fuel as compared with the former. The user may consider the fuel level while setting the temperature.

The server 178 may be further configured to communicate with a plurality of fleet vehicles 102 each configured to support the remote start and temperature report features. For instance, the user may be associated with the vehicle 102*a*, whereas the rest of the fleet vehicles 102 are those located within the same geofence with the vehicle 102*a* for references. The geofence may be predefined by the system to reflect an area with similar weather conditions. For instance, the geofence may be defined by a zip code or postal code of a region. Alternatively, the server 178 may be configured to define a customized geofence using the weather condition 202 from the cloud. The server may be configured to obtain a vehicle perceived condition 210 from the fleet vehicles within the geofence indicative of an actual temperature and condition (e.g. sun, shade) perceived by the vehicle as the weather condition 202 which may only be a forecast may be inaccurate, the vehicle perceived condition 210 may be helpful to determine vehicle ventilation in some cases when a temperature difference between the current cabin temperature and the external ambient air temperature is great. For instance, lowering vehicle windows to ventilate heat trapped through the greenhouse effect would provide an efficient cooling process in addition to A/C. Moon roofs or other electronically controlled vents may also be used for heat ventilation. The server 178 may be further configured to obtain vehicle configurations 212 and vehicle historic temperatures 214 from the fleet vehicles 102 to more accurately calculate the time required for the vehicle 102*a* to reach the desired temperature. The vehicle configuration 212 may include information about configurations that may affect the performance of the vehicle HVAC system. For instance, the vehicle configuration may include information about vehicle brand, model, year, engine power, AC compressor power, type of powertrain (e.g. gasoline engine, electric motor, hybrid) or the like. Vehicle configuration 212 from fleet vehicles 102 with similar configurations to the vehicle 102a of the user may be given more weight during calculation. The vehicle historic temperature 214 may include historic temperature data of the fleet vehicles 102 such as a length of time for the vehicles to reach a desired temperature from a starting temperature. The historic temperature 214 may be useful for the server 178 to analyzing at a specific timeframe of a day within the same geofence.

Figure 3:
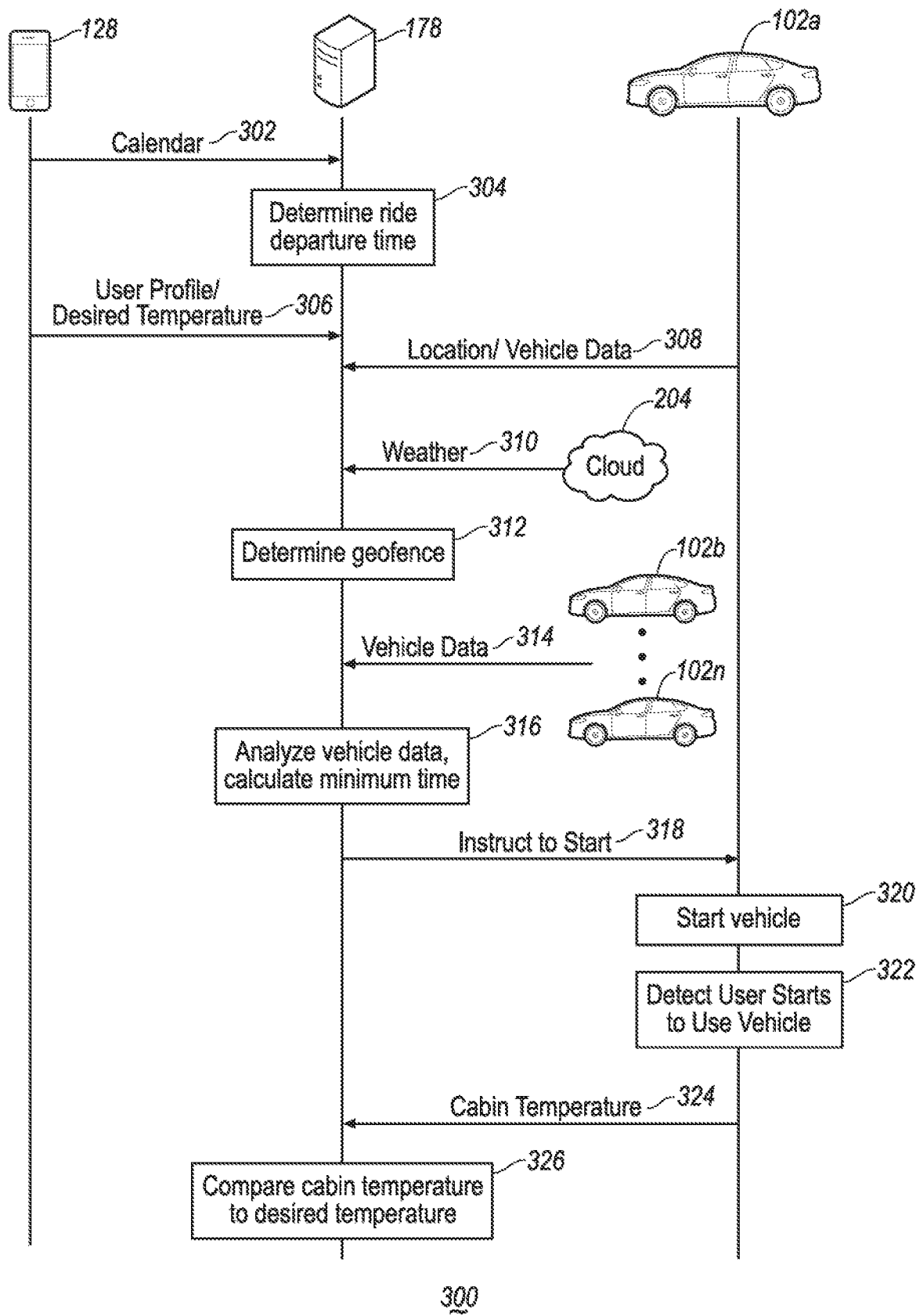
FIG. 3 illustrates an example flow diagram of the vehicle system of one embodiment of the present disclosure.

Referring to FIG. 3, an example flow diagram for a remote start process 300 of the vehicle system of one embodiment of the present disclosure is illustrated. With continuing reference to FIGS. 1 and 2, at operation 302, the server 178 accesses to the user mobile device 128 to obtain the calendar of the user and determine a scheduled ride using the calendar at operation 304. The calendar may include information about a meeting/event scheduled at a certain time at a certain location. The server 178 may calculate the time required to arrive the meeting location and therefore obtain the departure time of the ride. Addition or alternatively, the calendar may be obtained elsewhere (e.g. from the cloud 204) as discussed above. At operation 306, the server 178 receives a desired temperature of the user from the mobile device 128. Additionally, the server 178 may receive a user profile from the mobile device 128. The user profile may include various preferences including the desired temperature of the user. In case of a ride sharing situation, the user profile may further identify one of the fleet vehicles 102 for the scheduled ride. Responsive to determining the desired temperature as well as the identity of the designated vehicle (e.g. vehicle 102a), at operation 308, the server 178 receives vehicle data from the vehicle 102a designated to the scheduled ride. The vehicle data may include the current location of the vehicle 102a. Additionally, the vehicle data may include a vehicle perceived temperature 210, vehicle configuration 212, and/or vehicle historic temperature 214 of the vehicle 102a for analysis. With the location of the vehicle 102a, the server 178 receives a weather condition 202 for the vehicle location around the time of the scheduled ride at operation 310. At operation 312, the server 178 determines a geofence within which the vehicle 102a is located at operation 310. As discussed above, the geofence may be predetermined by the system. Alternatively, the server 178 may be configured to calculate the geofence using the weather condition 202 received from the cloud 204. For instance, if the weather condition 314 reports a specific weather condition (e.g. rain) in an area within with the vehicle 102a is located, the server 178 may arbitrarily define the geofence to be the area of that specific weather condition for more accurate analysis.

With the geofence determined, at operation 314, the server 178 obtains vehicle data from fleet vehicles 102b . . . 102n located within the geofence for analysis. As discussed above, the vehicle data may include vehicle perceived temperature 210, vehicle configuration data 212, and/or vehicle historic temperature 214. At operation 316, the server 178 analyzes the vehicle data from the designated vehicle 102a as well as the fleet vehicles 102b . . . 102n, and calculate the minimum time required to the designated vehicle 102a to reach the desired temperature. With the minimum time calculated, the server 178 sends the instruction to start to the vehicle 102a at operation 318. The instruction to start may further include instructions for the HVAC controller to operate the cabin climate of the vehicle 102. Responsive to receiving the instruction from the server 178, the vehicle 102a starts and activates the HVAC system at operation 320. At operation 322, the vehicle 102a detects the user starts the ride. In response, the vehicle records the current cabin temperature as compared with the desired temperature as a part of the vehicle historic temperature 214 for future reference. Additionally, at operation 324, the vehicle 102a sends the current cabin temperature to the server 178 for recordation. The server 178 compares the cabin temperature at the time the user starts the ride with the desired temperature to adjust future calculations.

In certain situations, the vehicle 102a may not be able to start responsive to the instruction from the server 178 for various reasons such as the vehicle is parked in an enclosed environment as detected via the sensors 184. In this case, the vehicle 102a may reject the start instruction and respond a message to the server 178 about the situation. The server 178 may forward the message to the mobile device 128 to inform the failure to start the vehicle 102a.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A server, comprising:
a processor, programmed to
responsive to receiving a vehicle location from a vehicle, calculate a geofence using the vehicle location,
receive a weather condition of the vehicle location from a cloud server,
responsive to receiving a calendar of a user including an event, calculate a departure time based on the vehicle location and a location of the event,
receive a desired cabin temperature of the user from a mobile device,
identify a fleet vehicle within the geofence, and
receive, from the fleet vehicle, a fleet-vehicle-perceived condition, a fleet vehicle configuration, and a fleet vehicle historic temperature indicative of a length of time for the fleet vehicle to reach from a first cabin temperature to a second cabin temperature within the geofence,
calculate a minimum time for the vehicle to reach the desired cabin temperature based on the weather condition,
calculate a vehicle start time using the departure time and the minimum time, and
send an instruction to the vehicle to start at the vehicle start time.

2. The server of claim 1, wherein the processor is further programmed to:
receive, form the vehicle, a vehicle-perceived condition, a vehicle configuration, and a vehicle historic temperature indicative of a vehicle cabin temperature changing rate,
wherein the calculation of the minimum time is further based on the vehicle-perceived condition, the vehicle configuration, and the vehicle historic temperature.

3. The server of claim 1, wherein the processor is further programmed to:
calculate the geofence accounting for the weather condition as an area enclosing the vehicle location.

4. The server of claim 1, wherein the processor is further programmed to:
calculate the geofence using a zip code for an area in which the vehicle location is located.

5. The server of claim 1, wherein the processor is further programmed to:
receive a user profile identifying the vehicle from the mobile device associated with the user; and
request for the vehicle location of the vehicle as identified.

6. The server of claim 1, wherein the processor is further programmed to:
receive an actual cabin temperature as the user starts to use the vehicle; and
compare the actual cabin temperature with the desired cabin temperature for future adjustment of temperature.

7. The server of claim 1, wherein the processor is further programmed to:
responsive to receiving a failure message from the vehicle indicative of a failure of the vehicle to start responsive to the instruction, send the failure message to the mobile device.

8. The server of claim 1, wherein the processor is further programmed to:
responsive to receiving a second departure time manually input by the user via the mobile device, override the departure time using the second departure time.

9. The server of claim 1, wherein the instruction includes a command for a heating ventilation air-conditioning controller of the vehicle.

10. A method for a server, comprising:
receiving a user profile from a mobile device associated with a user identifying a vehicle for a ride and a desired cabin temperature;
receiving a vehicle location, a vehicle perceived condition, a vehicle configuration, and a vehicle historic temperature from the vehicle as identified, the vehicle historic temperature being indicative of a length of time for the vehicle to reach from a first cabin temperature to a second cabin temperature measured by the vehicle;
obtaining a calendar associated with the user including an event having an event location;
calculating a departure time based on the vehicle location and the event location;
receiving a weather condition of the vehicle location from a cloud server;
calculating a minimum time for the vehicle to reach the desired cabin temperature based on the weather condition, the vehicle perceived condition, the vehicle configuration, and the vehicle historic temperature;
calculating a vehicle start time using the departure time and the minimum time; and
sending an instruction to the vehicle to start at the vehicle start time.

11. The method of claim 10, further comprising:
calculating a geofence enclosing the vehicle location;
identifying a plurality of fleet vehicles within the geofence;
receiving a fleet vehicle perceived condition, a fleet vehicle configuration, and a fleet vehicle historic temperature from the fleet vehicles; and
calculating the minimum time accounting for the fleet vehicle perceived temperature, the fleet vehicle configuration, and the fleet vehicle historic temperature as received from the fleet vehicles.

12. The method of claim 11, further comprising:
calculating the geofence accounting for the weather condition of an area enclosing the vehicle location.

13. The method of claim 11, further comprising:
calculating the geofence using a zip code for an area which the vehicle location falls into.

14. The method of claim 11, further comprising:
receiving an actual cabin temperature as the user starts to use the vehicle; and
comparing the actual cabin temperature with the desired cabin temperature for future adjustment.

15. The method of claim 11, further comprising:
responsive to receiving a failure message from the vehicle indicative of failing to start, sending the failure message to the mobile device.

16. The method of claim 11, further comprising:
responsive to receiving a second departure time manually input by the user via the mobile device, overriding the departure time using the second departure time.

17. The method of claim 11, wherein the instruction includes a command for a heating ventilation air-conditioning controller of the vehicle.

18. A non-transitory computer-readable medium comprising instructions that, when executed by a processor of a computer, cause the computer to:
receive a user profile from a mobile device associated with a user identifying a vehicle for a ride and a desired cabin temperature;
receive a vehicle location, a vehicle perceived condition, a vehicle configuration, and a vehicle historic temperature from the vehicle as identified, the vehicle historic temperature being indicative of a length of time for the vehicle to reach from a first cabin temperature to a second cabin temperature measured by the vehicle;
obtain a calendar associated with the user including an event having an event location;
calculate a departure time based on the vehicle location and the event location;
receive a weather condition of the vehicle location from a cloud server;
calculate a geofence enclosing the vehicle location;
responsive to identifying a plurality of fleet vehicles within the geofence, receive a fleet vehicle perceived condition, a fleet vehicle configuration, and a fleet vehicle historic temperature from the fleet vehicles;
calculate a minimum time for the vehicle to reach the desired cabin temperature based on the weather condition, the vehicle perceived condition, the vehicle configuration, the vehicle historic temperature as received from the vehicle, the fleet vehicle perceived temperature, the fleet vehicle configuration, and the fleet vehicle historic temperature as received from the fleet vehicles;
calculate a vehicle start time using the departure time and the minimum time; and
send an instruction to the vehicle to start at the vehicle start time.

19. The non-transitory computer-readable medium of claim 18, further comprising instructions that, when executed by a processor of a computer, cause the computer to:
calculate the geofence using a zip code for an area which the vehicle location falls into.

* * * * *